US006377963B1

(12) United States Patent
Walker et al.

(10) Patent No.: US 6,377,963 B1
(45) Date of Patent: *Apr. 23, 2002

(54) METHOD AND SYSTEM FOR ATTACHING CUSTOMIZED INDEXES TO PERIODICALS

(75) Inventors: Jay S. Walker, Ridgefield; Thomas M. Sparico, Riverside, both of CT (US)

(73) Assignee: Walker Digital, LLC, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,250

(22) Filed: May 23, 1997

(51) Int. Cl.[7] .............................................. G06F 15/00
(52) U.S. Cl. ........................ 707/530; 707/3; 707/102; 345/789
(58) Field of Search .............................. 707/530, 2, 3, 707/102; 345/329, 789

(56) References Cited

U.S. PATENT DOCUMENTS

| | | | |
|---|---|---|---|
| 4,109,938 A | * 8/1978 | Mitchell et al. | 434/365 |
| 4,532,554 A | 7/1985 | Skala | |
| 5,029,830 A | 7/1991 | Quadracci | |
| 5,080,337 A | * 1/1992 | Mayer et al. | 270/1.1 |
| 5,107,656 A | * 4/1992 | Katz et al. | 53/131.4 |
| 5,114,128 A | * 5/1992 | Harris, Jr. et al. | 270/11 |
| 5,144,562 A | * 9/1992 | Stikkelorum et al. | 700/223 |
| 5,189,863 A | 3/1993 | Pozzi | |
| 5,197,262 A | 3/1993 | Katz et al. | 53/550 |
| 5,267,821 A | * 12/1993 | Bodart et al. | 412/11 |
| 5,404,505 A | * 4/1995 | Levinson | 707/10 |
| 5,439,340 A | 8/1995 | Volkmann | |
| 5,468,085 A | 11/1995 | Kline | |
| 5,641,182 A | * 6/1997 | Schwandt | 283/36 |
| 5,675,788 A | * 10/1997 | Husick et al. | 395/615 |

(List continued on next page.)

OTHER PUBLICATIONS

Foltz et al., Personalized Information Delivery: An Analysis of Information Filtering Methods, Communications of the ACM, 12/92, pp. 51–60.*

Child, The Essential Guide For Today's Parents, Subscription Free Bonus Offer, "How Old Is Your Child?" 3 pages, Oct. 1996.

Child, The Essential Guide For Today's Parents, "5 Month–Old Your Child Now," 5 pages, Nov. 1996.

*Primary Examiner*—Stephen S. Hong
*Assistant Examiner*—Cong-Lac Huynh
(74) *Attorney, Agent, or Firm*—Dean P. Alderucci

(57) ABSTRACT

The present invention solves the problems of the prior art by providing customized content-sensitive indexes, created for each reader from previously supplied user profiles. Information is provided in advance by the user for the creation of a sophisticated index scanning all articles in a given publication. User supplied factors and relationships between factors, as well as scanning criteria, identify the specific information most useful to the reader. For example, the customer may provide a request to have all articles relating to "n", where "n" is a key phrase or word relating to some area of interest. The system would then scan the content of a magazine and retrieve all articles where that key phrase or word appears "x" times and at least one of those times is "y" words away from "z". The indexes themselves are attached or otherwise provided, via fax, Internet, etc., for use with the physical magazine and can quickly and easily identify only those articles known to be of interest to the reader, segregating them from perhaps hundreds of less important articles. This custom index thus makes it possible for a consumer to locate articles which are highly likely to be of interest—a problem that would otherwise be impractical to solve without a wastefully large investment of time.

37 Claims, 11 Drawing Sheets

U.S. PATENT DOCUMENTS

| | | | | |
|---|---|---|---|---|
| 5,685,003 A | * | 11/1997 | Peltonent et al. | 395/793 |
| 5,694,546 A | * | 12/1997 | Reisman | 340/551 |
| 5,724,567 A | * | 3/1998 | Rose et al. | 707/2 |
| 5,748,954 A | * | 5/1998 | Mauldin | 395/610 |
| 5,749,081 A | * | 5/1998 | Whiteis | 707/102 |
| 5,761,485 A | * | 6/1998 | Munyan | 345/350 |
| 5,761,662 A | * | 6/1998 | Dasan | 707/10 |
| 5,768,521 A | * | 6/1998 | Derick | 709/224 |
| 5,796,393 A | * | 8/1998 | MacNaughton et al. | 345/329 |
| 5,796,395 A | * | 8/1998 | De Hond | 345/331 |
| 5,796,952 A | * | 8/1998 | Davis et al. | 395/200.54 |
| 5,819,273 A | * | 10/1998 | Vora et al. | 707/10 |
| 5,832,472 A | * | 11/1998 | Sheppard, II | 707/1 |
| 5,835,087 A | * | 11/1998 | Herz et al. | 345/327 |
| 5,857,181 A | * | 1/1999 | Augenbraun et al. | 707/2 |
| 5,901,287 A | * | 5/1999 | Bull et al. | 395/200.48 |
| 5,907,836 A | * | 5/1999 | Sumita et al. | 707/2 |
| 5,953,732 A | * | 9/1999 | Meske, Jr. et al. | 707/513 |
| 6,009,410 A | * | 12/1999 | LeMole et al. | 705/14 |
| 6,014,654 A | * | 1/2000 | Ariyoshi | 706/62 |
| 6,055,513 A | * | 4/2000 | Katz et al. | 705/26 |

251

| MAGAZINE ID NUMBER | MAGAZINE NAME | PERIODS |
|---|---|---|
| T34 | TIME | WEEKLY |
| P21 | PEOPLE | WEEKLY |
| C34 | CRAIN'S | WEEKLY |

FIG. 3a

| MAGAZINE ID NUMBER | ISSUE NUMBER | NUMBER OF ARTICLES | ARTICLE TITLE | CONTENT CODE | AUTHOR | PAGE NUMBER |
|---|---|---|---|---|---|---|
| T34 | 467 | 10 | "MAN OF THE YEAR" | 4367 | BOB SMITH | 42 |
| T34 | 467 | 10 | "STANDOFF IN WACO" | 5210 | JILL JONES | 12 |
| T34 | 467 | 10 | "CLINTON WINS ELECTION" | 3672 | JIM FORD | 33 |

| SUBSCRIBER NUMBER | NAME | MAGAZINE ID NUMBER | INDEX NUMBER | SUBSCRIPTION EXPIRATION DATE | ADDRESS | PHONE NUMBER | CREDIT CARD NUMBER |
|---|---|---|---|---|---|---|---|
| 4368 | TOM FORREST | T34 | 541 | 1/1/98 | 1 RED DR. | (203)-604-3271 | 4028 1255 5689 8555 |
| 4369 | BRIAN GREEN | T34 | 549 | 2/12/98 | 2 BLUE RD. | (203)-637-4210 | 9141 4565 5582 5466 |
| 4370 | LLOYD KELLY | T34 | 603 | 3/23/98 | 3 GREEN DR. | (203)-914-7386 | 4120 2316 5646 8791 |

| INDEX NUMBER | SUBSCRIBER NUMBER | PREFERENCES | SUBSCRIBER CONTENT CODE |
|---|---|---|---|
| 541 | 4368 | SPACE, NASA | 3231 |
| 549 | 4369 | DINOSAURS, ANTHROPOLOGY | 4610 |
| 603 | 4370 | SPORTS, FINANCE | 5210 |

| MAGAZINE ID NUMBER | ISSUE NUMBER | SUBSCRIBER NUMBER | INDEX NUMBER | INDEXED ARTICLES |
|---|---|---|---|---|
| T34 | 467 | 4368 | 541 | "THE ..." |
| T34 | 467 | 4369 | 549 | "FINANCE ..." |
| T34 | 467 | 4370 | 603 | "POLITICS ..." |

FIG. 3e

METHOD AND SYSTEM FOR ATTACHING CUSTOMIZED INDEXES TO PERIODICALS

BACKGROUND OF THE INVENTION

1. Field of the Invention

The present invention relates to periodicals. More specifically, the invention relates to a method and system for managing information presented in periodicals by creating personalized indexes.

2. Background

One of the most difficult challenges for present day professionals is dealing with the information overload which accompanies keeping up to date on current events. A typical business person may have a schedule consumed with travel and work time. Staying current in a profession may be vital to success, yet is often very difficult to do. In an attempt to stay current, many readers turn to magazines, journals and periodicals (collectively termed 'magazines') as a primary source of information. They provide current and expert information on an almost limitless number of topics.

Reading magazines alone, however, does not present a solution for the dilemma of information overload facing readers. The sheer volume of information provided in magazines often overwhelms a reader's ability to process it. It is typical for a single magazine to include over one hundred articles, with a dozen or more directed to a single topic. Printed indices and tables of contents may themselves run for many pages. If a reader desires to receive current information, for example, on a particular person or company, he may find dozens references to that company or person indexed within a single magazine. Often the reader must dedicate valuable time evaluating all of the content in order to determine which of it satisfies his particular interests.

For example, a very popular publication which caters to many professionals today is *Forbes* magazine. *Forbes* offers up to date and important content relating to the business world and can be a very valuable tool for today's business person. A typical issue of *Forbes* consists of a table of contents displaying up to fifty articles containing over twenty thousand words dispersed over twenty broad categories of business. To help *Forbes* readers navigate this information, the magazine includes an index of companies and names. This index itself is often three or four pages long and lists several hundred names and companies which are included throughout the issue. It becomes obvious that the reader would have to spend a substantial amount of valuable time to locate preferred content either by carefully reviewing the index or table of contents, or scanning through the two hundred pages of the magazine. For example, if a reader wanted to find information on Bill Gates or Microsoft in a given issue of *Forbes*, he might find dozens of references for both the company and the person. Many of these references may be of little value while others might be more directly relevant. The index only provides the page numbers where the name or company, and typically does not describe what the article relates to or the content in which a name or company is mentioned.

Thus, while magazines provide an excellent source of information for a consumer, their practical utility is limited by the gross quantity of information they provide.

There have been various attempts made to solve this problem of information overload.

Abstract services are available which produce abstracts of magazine articles covering specific areas of interest to information consumers. These abstracts are distributed in accordance with reader profiles and are used to identify articles of likely interest to the consumer. Upon request, the reader may obtain full copies of the articles. Such services suffer, however, from the obvious drawback that access to the full article requires a separate time-consuming action and a positive effort on the part of the consumer.

At least one magazine, *American Baby*, attempts to include custom editorial matter. Profile data is collected from subscribers for the purpose of providing targeted content to individual subscribers. If, for example, a subscriber is identified as having a three-months old infant, then an article relevant to such an infant may be specially inserted into that subscriber's magazine along with the standard content. The inclusion of that insert is noted on the cover.

Such a process suffers from the significant short-coming of not making it any easier to find other relevant articles in the magazine. The magazine still contains hundreds of pages of standard-content information that, as described above, contributes to the information overload of the reader.

SUMMARY OF INVENTION

Methods and systems consistent with the present invention allow subscribers to receive periodicals, such as magazines, for which custom indexes are provided. The indexes identify the standard printed content contained in the periodicals that match respective subscribers' preferences. In this way, a subscriber can quickly identify whether such a periodical contains standard printed content of interest to him and what the standard printed content is, and where in the magazine it is located.

To achieve these and other advantages and in accordance with the purpose of the invention, as embodied and broadly described, a system consistent with this invention comprises a method of manufacturing a customized index for use with a periodical. The method comprises the steps of receiving personal preference data indicative of at least one content category of interest to a subscriber; receiving content data relating to the standard printed content of a periodical; comparing said content data with said personal preference data; generating index data based upon said comparison; and outputting a customized index containing said index data for use with said periodical. The customized index may be attached to a periodical, thereby providing a periodical having a customized index to standard content.

In another aspect, the invention comprises an index for use with a periodical to be delivered to a subscriber. The index is customized to identify standard printed content of interest to a subscriber according to preselected personal preferences indicative of at least one content category of interest to a subscriber, the identified standard printed content of interest being contained in the periodical.

Both the foregoing general description and the following detailed description are exemplary explanatory and are intended to provide further explanation of the invention as claimed.

BRIEF DESCRIPTION OF THE DRAWINGS

The accompanying drawings are included to provide a further understanding of the invention and, together with the Detailed Description, serve to explain the principles of the invention.

In the drawings:

FIGS. 3a–3e show sample fields of magazine database 251, content database 252, subscriber database 253, preferences database 254, and issue database 255, respectively, contained in data storage device 250 shown in FIG. 2;

DETAILED DESCRIPTION

Introduction

The invention allows a subscriber of a periodical to quickly identify whether an issue of the periodical contains standard printed content of interest to the subscriber and what that standard printed content is. The subscriber provides a list of personal preferences indicative of standard printed content that the subscriber is interested in reading. The publisher of the periodical compares the personal preferences with content information for a particular issue of the periodical to determine whether the issue contains standard printed content matching the subscriber's personal preferences. The publisher then creates a customized index, which a fulfillment house attaches to the periodical mailed to the particular subscriber.

The preferred embodiment of the invention involves attaching to a periodical an "outer wrap," on which the customized index is printed. As used in this specification, the term "outer wrap" generally refers to any article, attachable to a periodical, on which an index may be printed. Examples of an "outer wrap" includes, but not limited to, a paper or cardboard wrapper in which the periodical is provided, an adhesive label, an envelope, a card, and a poly bag outer cover. In alternative embodiments, the customized index may be printed directly on the outside or inside of the periodical or printed on an insert, such as a bind-in card, affixed to the inside of the periodical. Further, it is to be understood that the index could be delivered via facsimile, electronic mail, phone (using an IVRU), or the Internet. In addition, unless otherwise indicated, the term "magazine" is used in this specification interchangeably with "periodical," which refers generally to any publication or work for which one or more issues are published or for which a subscription may be obtained in any medium, such as a magazine, newspaper, journal, CD ROM, cassette tape, video tape, and computer-readable medium. Similarly, unless otherwise indicated, the term "article" is used in this specification to mean any content, material, or writings contained in a periodical, including articles, reports, summaries, stories, songs, films, clips, and computer programs.

The term "standard printed content" refers to content contained in a periodical for general distribution and is distinguishable from specialized content, which is directed to a particular group of subscribers according to subscriber characteristics.

System

Figure 1:
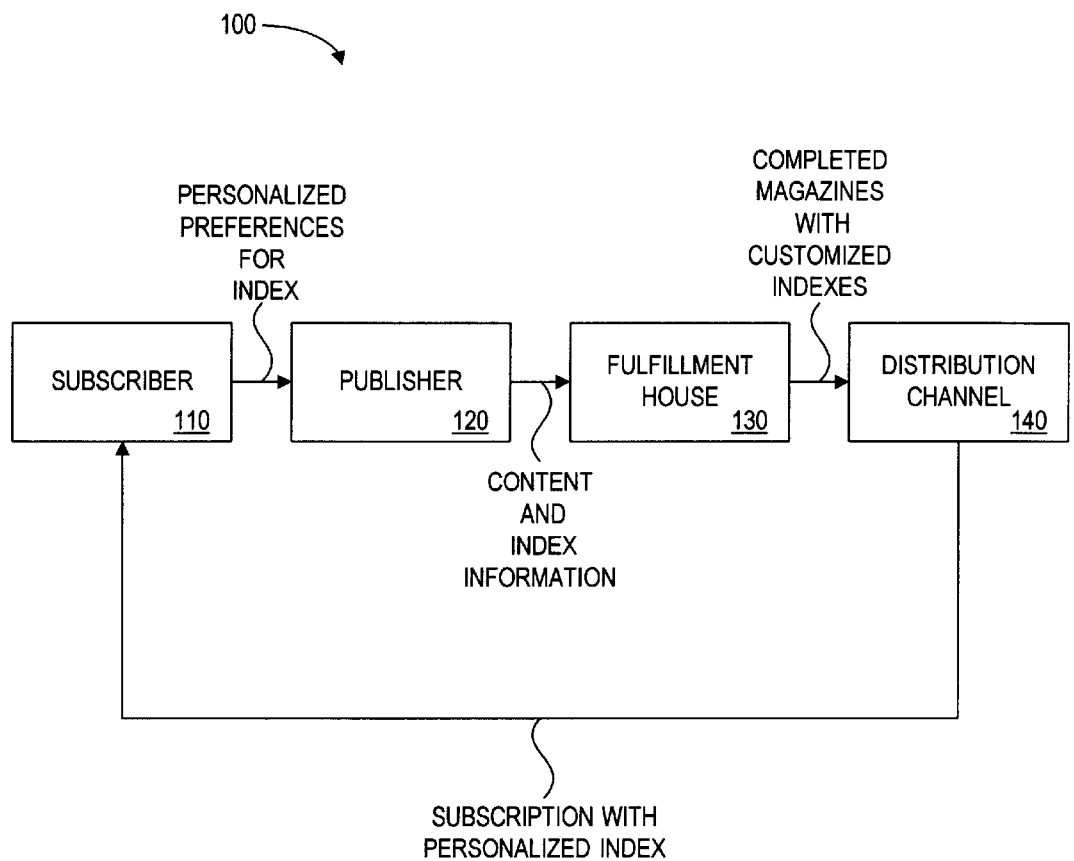
FIG. 1 is a block diagram of a system consistent with the invention.

FIG. 1 illustrates system 100, according to a preferred embodiment of the invention. System 100 includes subscriber 110, publisher 120, fulfillment house 130, and distribution channel 140. As shown in FIG. 1, publisher 120 is in communication with subscriber 110 and fulfillment house 130. Distribution channel 140 receives magazines from fulfillment house 130 and delivers them to respective subscribers, such as subscriber 110.

Subscriber 110 represents a person who desires to obtain a subscription to a periodical, such as a magazine. Subscriber 110 communicates with publisher 120 by transmitting, for example, personal preference information, which identifies standard printed content of interest. Personal preference information preferably identifies attributes indicative of articles of interest and may specify, for example, the article's general subject matter (e.g., sports, politics), specific subject matter defined by key words found in the articles (e.g., companies of interest, industries of interest, people of interest, geographic areas of interest), the name of the articles' authors or creators, and the article type (e.g., editorial, product review).

Publisher 120 represents the publisher of a periodical for which subscriber 110 desires a subscription. In a preferred embodiment, publisher 120 includes a processor-based system having a central controller configured to receive personal preference information from subscriber 110 and generate appropriate index information for transmission, along with content information, to fulfillment house 130.

Figure 2:
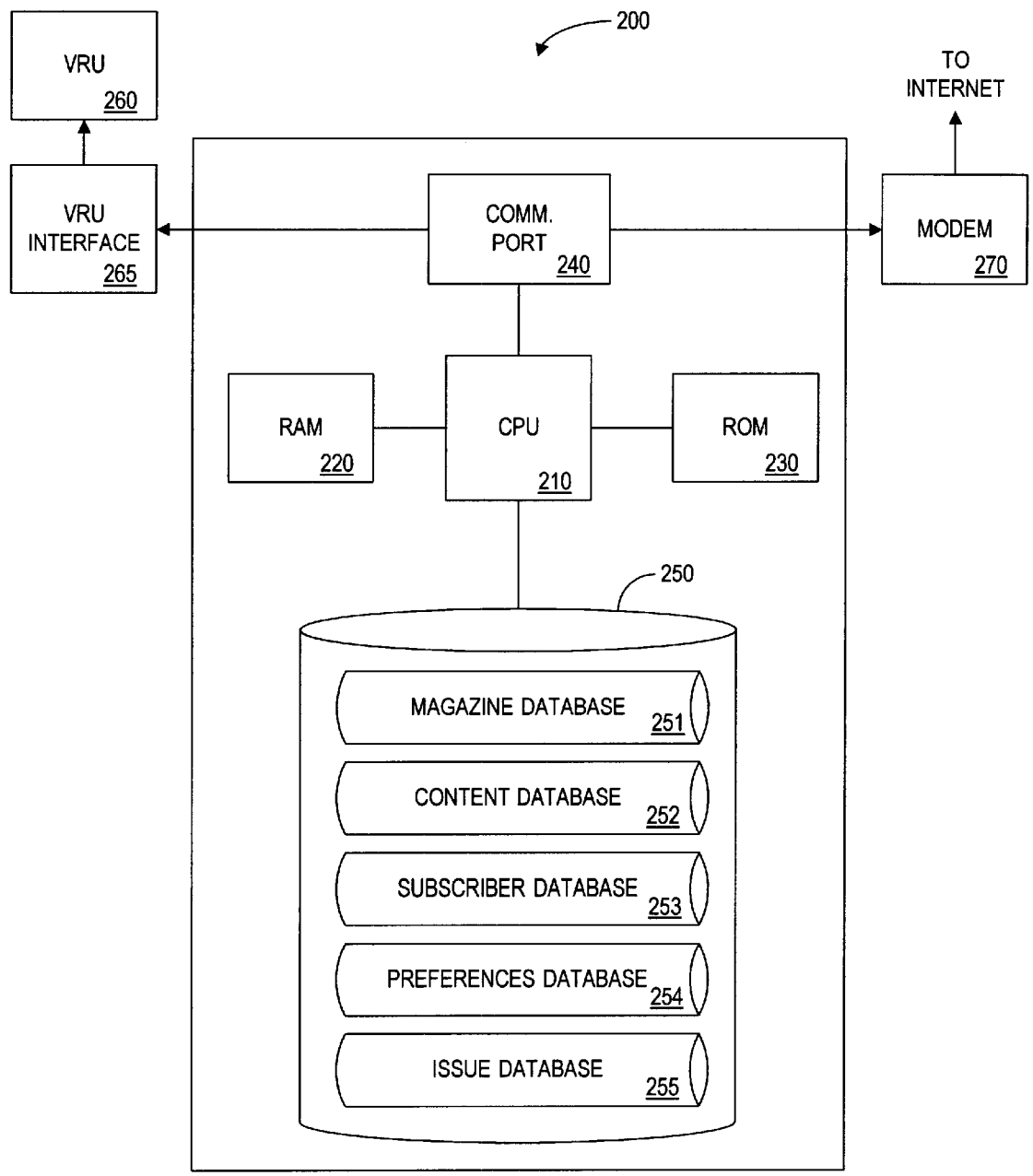
FIG. 2 is a block diagram of central controller 200 located at publisher 120 shown in FIG. 1.

FIG. 2 is a block diagram of a central controller 200 of publisher 120, according to one embodiment of the invention. Central controller 200 includes central processing unit (CPU) 210, random access memory (RAM) 220, read only memory (ROM) 230, communications port 240, and data storage device 250, which may be standard hardware components. CPU 210 is linked to each of the other elements and executes program modules stored in RAM 220, ROM 230, and/or data storage device 250 to perform operations and functions associated with central controller 200 described below. Central controller 200 may also include components to facilitate communication, such as a voice recognition unit (VRU) 260, VRU interface 265, and modem 270. Communication port 240 interfaces with VRU interface 265, which links to VRU 260, and modem 270, which links to a public switched telephone network.

Data storage device 250 maintains several databases, including magazine database 251, content database 252, subscriber database 253, preferences database 254, and issue database 255. Sample fields associated with these databases are described below in connection with FIGS. 3a–3e. In alternative embodiments, fewer or more fields may be included in these databases. Some of the fields described below are not needed to accomplish the invention, but are included to illustrate the types of data that may be used in conjunction with the invention. Likewise, in alternative embodiments, fewer or more databases may be used to store similar data in storage device 250.

Magazine database 251 generally contains data relating to magazines published by publisher 120. FIG. 3a illustrates a sample of the fields used in magazine database 251. The fields shown include (1) magazine ID number, (2) magazine name, and (3) periods. Magazine ID number (field 1) represents a unique identifier corresponding to a particular magazine title and is generally used by central controller 200 to specify particular magazine titles. Associated with the magazine ID number are the magazine name (field 2) and time periods (field 3) in which the particular issue was, or will be, published. Other information may also be provided in database 251 to permit access to additional information relating to the magazine.

Content database 252 generally contains data relating to articles contained in different magazine issues. FIG. 3b illustrates a sample of the fields in content database 252, which include (1) magazine ID number, (2) issue number, (3) number of articles, (4) article title, (5) content code, (6) author, and (7) page number. Each entry in database 252, indexed by magazine ID number and issue number, contains data relating to the content of a particular magazine issue, such as the number of articles in the issue (field 3), the articles' titles (field 4), the authors of the articles (field 6), and the articles' page numbers (field 7). Each entry may also be associated with one or more content codes (field 5), representing attributes associated with the content of the articles in a particular magazine issue. The content codes are generated according to a coding scheme that associates each content code with a unique attribute. These attributes may include an article's general subject matter (e.g., sports, politics), specific subject matter defined by key words found in the articles (e.g., companies of interest, industries of interest, people of interest, geographic areas of interest), the name of the articles' authors, and the article type (e.g., editorial, product review). For example, a content code may represent the specific subject matter of "Dinosaurs" and may be stored in correspondence with a particular issue of a magazine, such as a Time Magazine issue containing an article about dinosaurs. In an alternative embodiment, the content information in the content database 252 may be the full text article itself. In this embodiment, a type of intelligent search could be performed to identify the subscriber's interests, as will be further discussed below.

Subscriber database 253 contains data relating to subscribers of the magazines and, as shown in FIG. 3c, may include several fields, including (1) subscriber number, (2) name, (3) magazine ID number, (4) index number, (5) subscription expiration date, (6) address, (7) phone number, and (8) credit card number. Subscriber numbers (field 1) allow publisher 120 to uniquely identify subscribers. The Index Number field 4) stores information indicating by number whether preferences database 254 contains preference information for particular subscribers. The remaining information relates to subscriber information, such as address, phone number, and credit card number, and subscription information, such as the magazine to which the subscriber has subscribed and the date on which the subscription expires.

Preferences database 254 contains data relating to attributes indicative of magazine articles which subscribers are interested in reading and, as shown in FIG. 3d, is indexed by the index number (field 1). Each subscriber identified by subscriber number (field 2) may have one or more preferences (field 3), which identify desired attributes indicative of articles of interest and are preferably coded according to a coding scheme similar to the one used to code the content codes contained in content database 252. In an alternative embodiment, the preferences may appear in database 254 as text describing the desired attributes. Subscriber content code (field 4) designates the code corresponding to the preferences in field 3.

FIG. 3e illustrates sample fields for data found in issue database 255, which generally contains index information for respective subscribers. Database 255, as shown in FIG. 3e, includes the following fields: (1) magazine ID number, (2) issue number, (3) subscriber number, (4) index number, and (5) indexed articles. Indexed according to magazine ID number and issue number, entries in database 255 contain index information for corresponding subscribers. The index number identifies, by reference to Preferences Database 254, information to be printed on the customized index for each subscriber, and may identify such information as article names, authors, and corresponding page numbers associated with articles possessing the attributes to which the subscriber has indicated interest. The particular index information stored under field (4) may vary, however, according to the manner in which the customized index is to be constructed.

Fulfillment house 130 receives content and index information from publisher 120 and includes a bindery (not shown) which physically constructs magazines to which the customized indexes are attached. In a preferred embodiment, the bindery comprises a conventional facility for assembling magazines, which is controlled by a processor-based central controller 400 in a manner that facilitates the operations and functions described below. One conventional bindery utilizes a bindery line, or assembly line, in which magazine issues are constructed in stages. At the final stage, the bindery is preferably capable of attaching a customized index to a magazine by, for example, attaching a poly bag outer wrap containing the index to the magazine or printing the index directly on the magazine, according to signals from central controller 400.

Figure 4:
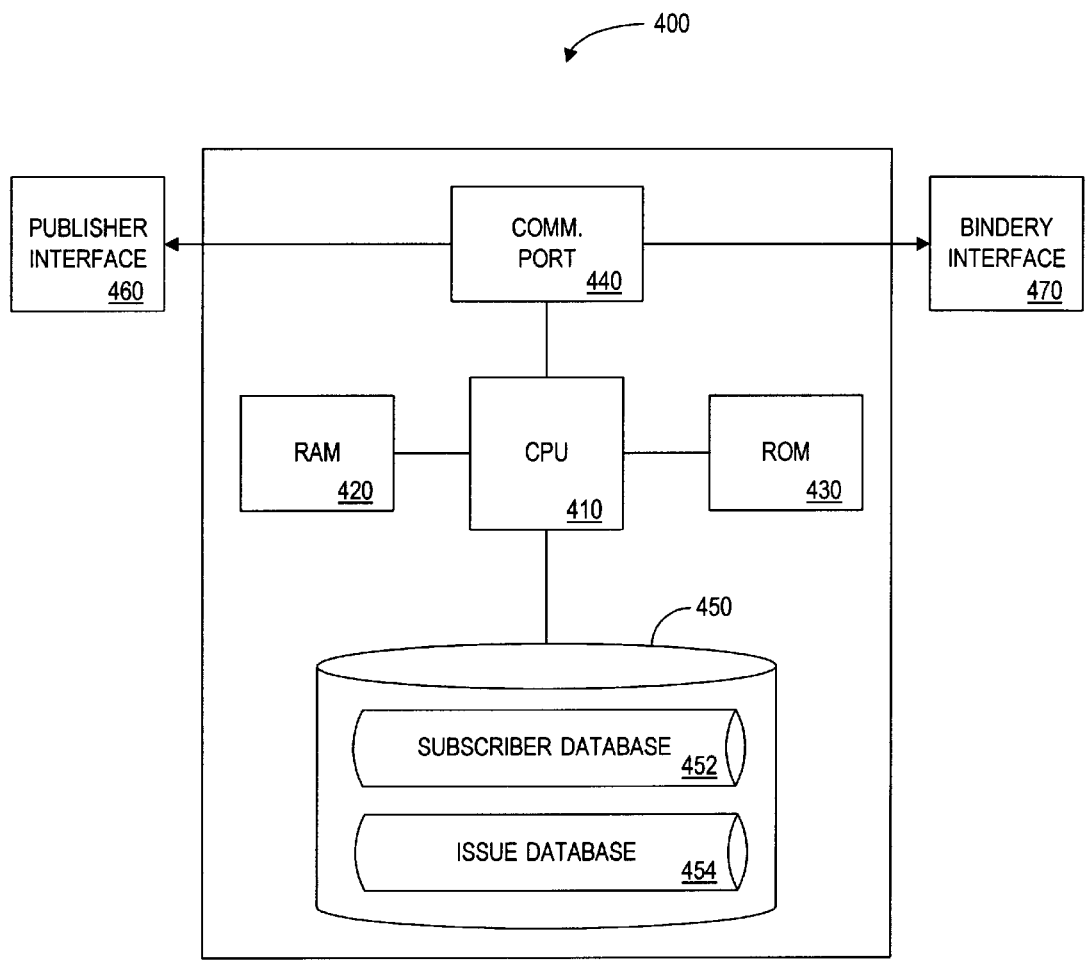
FIG. 4 shows a block diagram of central controller 400 located at fulfillment house 130 shown in FIG. 1.

FIG. 4 illustrates a preferred embodiment of central controller 400. As shown in FIG. 4, central controller 400 preferably includes certain conventional components, such as CPU 410, RAM 420, ROM 430, communications port 440, and data storage device 450. CPU 410 is coupled to the other elements and executes program code stored in RAM 420, ROM 430, and/or data storage device 450 to facilitate the functions and operations of central controller 400. Communications port 440 facilitates electronic communication with central controller 400 and, as shown in FIG. 4, is coupled to publisher interface 460 and bindery interface 470, which connect to publisher 120 and the bindery, respectively.

Data storage device 450 maintains several databases, including subscriber database 452 and issue database 454. These databases preferably contain the same or similar data as stored in databases 253 and 255, respectively. CPU 410 is capable of accessing the data stored in data storage device 450.

Distribution channel 140 represents one or more conventional entities which provides delivery service (e.g., postal delivery, parcel delivery, courier) and that delivers magazines containing customized indexes received from fulfillment house 130 to respective subscribers. Distribution channel 140 preferably operates in a manner that facilitates conventional modes of magazine distribution, such as home or office delivery for subscribers or delivery to a retail outlet for subscriber pick-up.

Operation of the System

Consistent with the invention, various operations of system 100 are now described in connection with the flowcharts illustrated in FIGS. 5–7.

Figure 5:
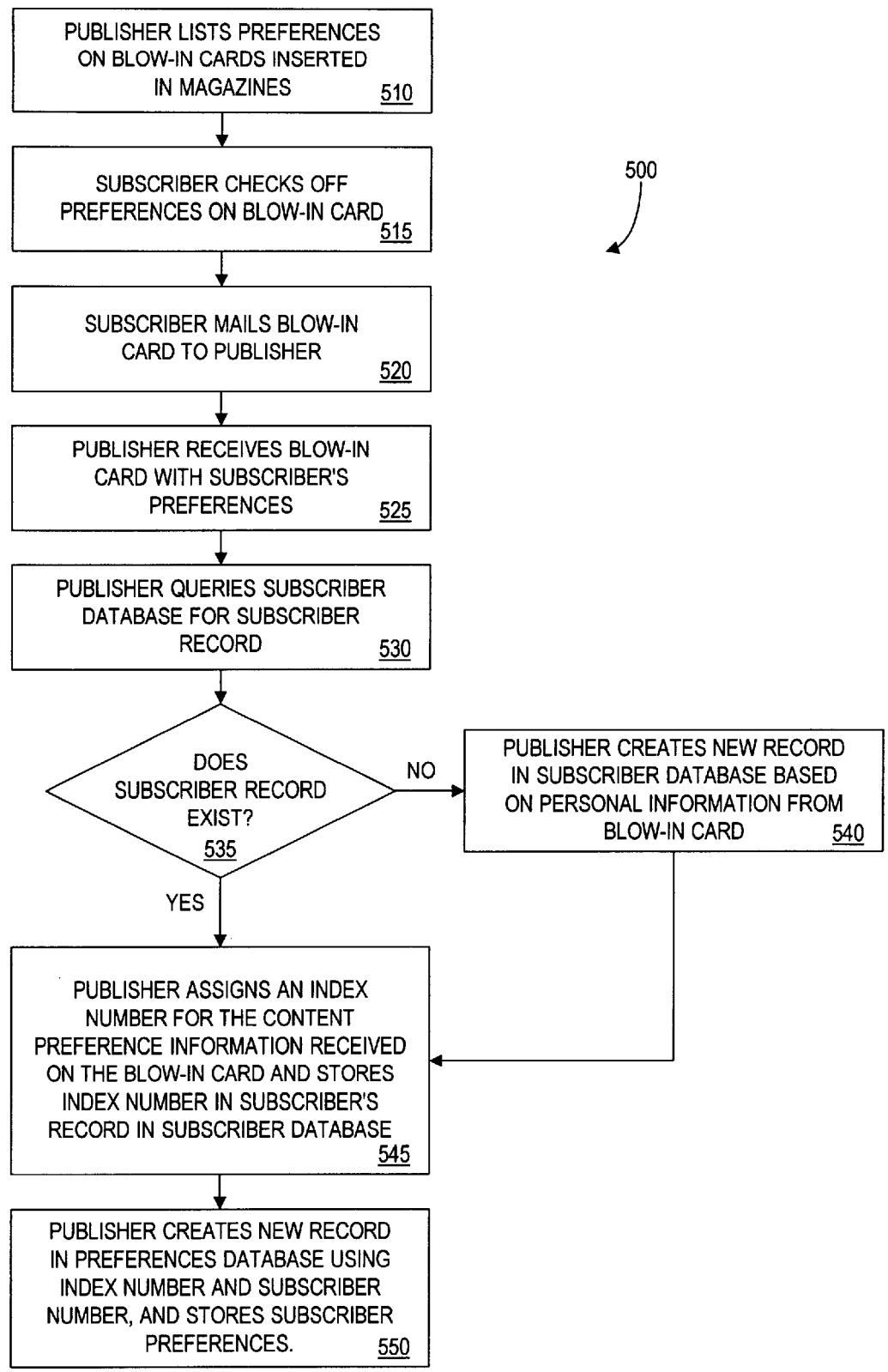
FIG. 5 shows flowcharts representing a process in which a subscriber provides subscriber information and preferences to a publisher for entry into subscriber database 253 and preferences database 254.

FIG. 5 contains flowchart 500 depicting a process in which a subscriber provides subscriber information and personal preferences to a publisher and the publisher enters the subscriber information. Publisher 120 lists preferences on blow-in, bind-in, or subscription cards inserted in magazines (step 510). Such cards are conventionally used by subscribers to mail in magazine subscription orders and are inserted into magazines using known methods. In one embodiment, these cards contain space for subscribers to fill in subscriber information (e.g., subscriber name, address, subscription duration, and payment information) as well as a list of personal preferences relating to magazine article attributes from which subscribers may select. Subscriber 110, who receives one of the blow-in cards, checks off or lists the preferences in which he is interested (step 515).

Subscriber 110 returns the completed blow-in card to publisher 120 by, for example, mailing the card (step 520). Publisher 120 receives the mailed blow-in card with the subscriber's personal preferences (step 525) and queries subscriber database 253 to determine whether a subscriber record exists for subscriber 110 (step 530). If a subscriber record does not exist for subscriber 110 (step 535), publisher 120 creates a new record in subscriber database 253 using the subscriber information provided on the received blow-in card (step 540). This new record is created in a conventional manner by, for example, entering subscriber information into subscriber database 253. Publisher 120 also assigns a subscriber number to subscriber 110, which is stored in subscriber 110's record as well.

Following step 540, or step 530 if a subscriber record already exists, publisher 120 assigns an index number for the content preference information received on the blow-in card and stores an index number in the subscriber's record in subscriber database 253. (step 545). Publisher 120 creates a record in preferences database 254 using the index number and subscriber 110's subscriber number stored in subscriber database 253 and stores preferences contained on the received blow-in card (step 550). In a preferred embodiment, the preferences are entered as preference codes according to a coding scheme in which the preference codes represent desired attributes of articles of interest. As previously mentioned with regards to the content of the magazine, the subscriber preferences could be stored as received in text format and not coded to allow for a different type of query to be performed.

The above-described process for communicating subscriber preferences to publisher 120 using blow-in or subscription cards constitutes one implementation of the invention. In alternative implementations, the subscriber preferences may be communicated using other conventional communication devices, such as the telephone (via VRU or live operator), facsimile, electronic mail and the Internet.

Figure 6:
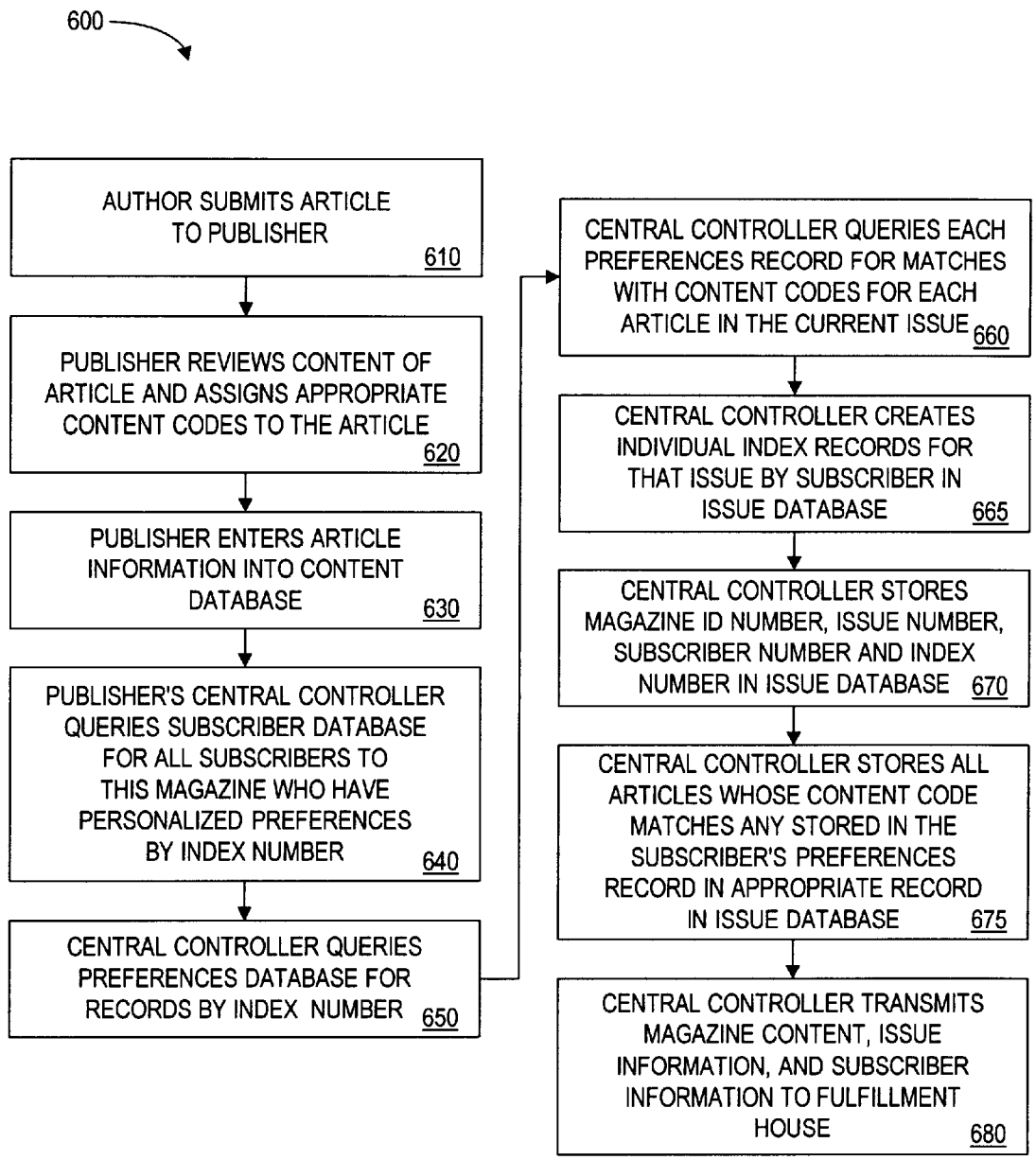
FIG. 6 shows a flowchart representing a process in which the publisher receives and processes content information of a magazine.

FIG. 6 shows flowchart 600 representing a process in which publisher 120 receives and processes the content information of a magazine. An author submits his article to publisher 120 (step 610), which reviews the content of the article and assigns appropriate content codes to the article (step 620). The content codes may be assigned according to an appropriate coding scheme, preferably compatible with the coding scheme employed for the preference codes. These content codes are generally assigned to reflect the content of the article. Publisher 120 enters article information into content database 252 (step 630). Examples of article information include the magazine ID number of the magazine in which the article will appear, the article title, appropriate content code(s), the author, and the page number at which the article will appear in the magazine.

Publisher 120's central controller 200 queries subscriber database 253 to determine the index numbers for the subscribers of a magazine for which personal preferences are stored in preferences database 254 (step 640). Central controller 200 then queries preferences database 254 by index number for records(step 650) and queries each preferences record for matches with content codes for each article in the current issue (step 660).

In an alternative embodiment, neither the content nor the preferences may have codes associated with them. In this embodiment the controller performs an intelligent query of the magazine content based on the preferences of the subscriber. The index is created, using a weighting method whereby the controller determines the relevance of any reference to a name or a company. Such a system operates as follows. The subscriber provides company A in his list of preferences. The controller is then programmed to query the magazine for all content where A is mentioned more than once within ten words of B, B being some additional piece of preference information. For example, the subscriber wants to see any articles about "Microsoft" relevant to the Internet in Wired magazine. The controller would query the content record for Wired in search of any articles which mention "Microsoft". Once the articles have been identified the controller would again query for "Microsoft" within three words of "internet" to determine the relevance of the article.

Once the articles of interest are identified, central controller 200 creates individual index records for each subscriber receiving that issue in issue database 255 (step 665). Central controller 200 stores magazine ID number, issue number, subscriber number, and index number in issue database 255 (step 670). Central controller 200 stores all articles whose content code matches any stored in the subscriber's preference record in issue database 255 (step 675). Central controller 200 transmits magazine content, issue information, and subscriber information to fulfillment house 130 (step 680). This transmission may be carried out by mailing printouts, or documentation, containing this information or by electronic transmission, such as modem, network connection, or wireless transmission.

Figure 7:
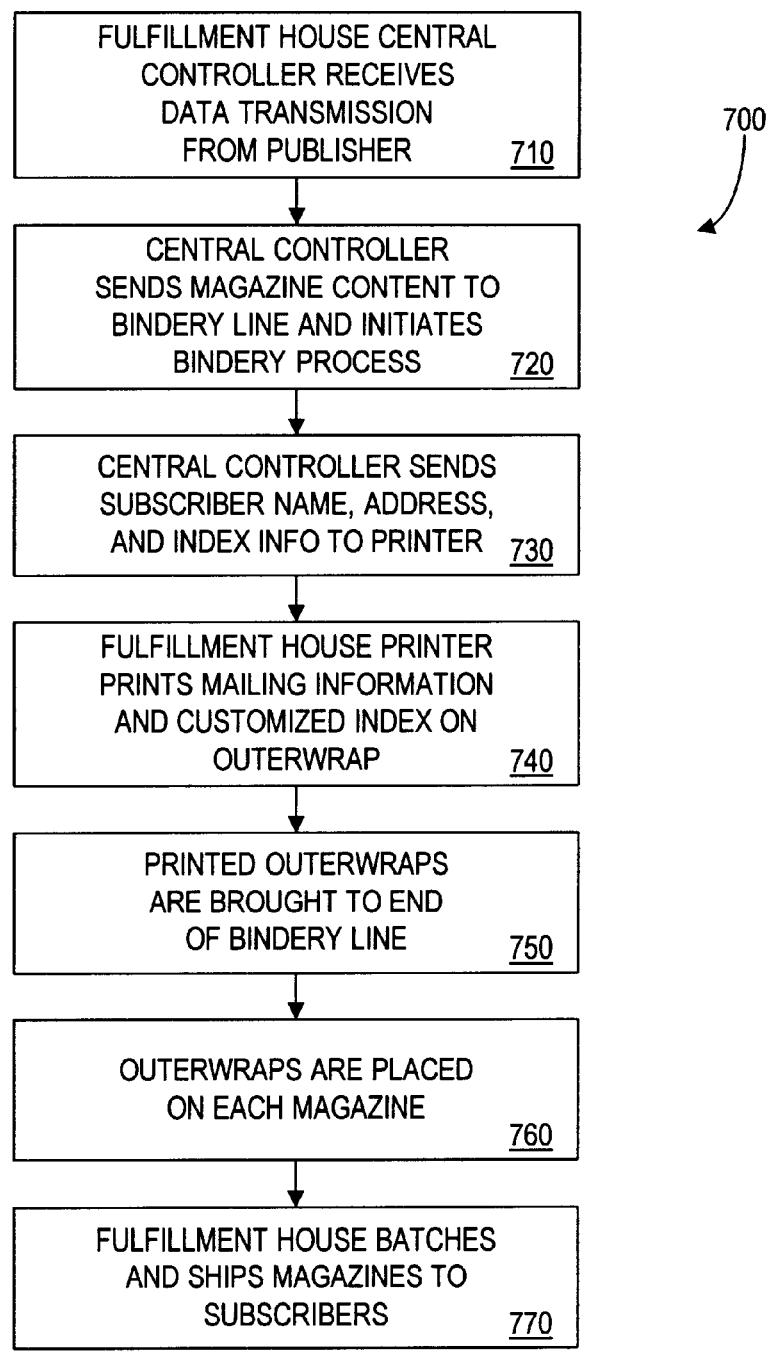
FIG. 7 shows a flowchart representing a process in which the fulfillment house processes index information received from the publisher to construct magazines with customized indexes.

FIG. 7 shows flowchart 700 representing a process in which fulfillment house 130 processes the index information to construct magazines with customized indexes. Central controller 400 receives the data transmission, including the content and index information, from publisher 120 (step 710). Central controller 400 sends the content information to a bindery line to initiate the bindery process of constructing magazines (step 720) and transmits subscriber name, address, and index information to a printer preferably located toward the end of the bindery line (step 730).

The printer prints mailing information and a customized index on an outer wrap (step 740), which is placed at the end of the bindery line (step 750) and attached to the respective magazines (step 760). In an alternative embodiment, the printer could print the mailing information and/or the customized index directly on or in the magazines without using an outer wrap. As previously mentioned, the index could be transmitted to the subscriber via facsimile, electronic mail, the Internet, phone, or any suitable means for communication. The related information necessary to perform such a transmission would be stored in the appropriate database, accessed accordingly, and used to execute the delivery. Fulfillment house 130 batches and ships the completed magazines, with the customized indexes, to respective subscribers, including subscriber 110 (step 770). This shipment may include conventional modes of delivering magazines, including mail, special delivery, and pick up.

Conclusion

It will be apparent to those skilled in the art that various modifications and variations can be made in the method and system of the present invention without departing from the spirit or scope of the invention. The present invention covers the modifications and variations of this invention provided they come within the scope of the appended claims.

What is claimed is:

1. A method of manufacturing a customized index for use with a periodical, comprising:

receiving personal preference data indicative of at least one content category of interest to a subscriber;

receiving content data relating to standard printed content of a periodical, in which said content data is independent of said personal preference data;

comparing said content data with said personal preference data, generating index data based upon a comparison of said content data with said personal preference data; and outputting a customized index containing said index data to be attached to said periodical and to be separate from said standard printed content.

2. The method according to claim 1, wherein said content data includes article identification data, page number data, and content code data.

3. The method according to claim 1, wherein said receiving personal preference data comprises;

transmitting an information request to a subscriber of a periodical;

receiving personal preference data in response to said information request;

storing said personal preference data in a personal preference database; and retrieving said personal preference data from said personal preference database.

4. The method according to claim 1, wherein said outputting comprise printing the customized index data on an outer wrap; and attaching said outer wrap to said periodical.

5. A system for manufacturing a customized index for use with a periodical, comprising:

means for receiving personal preference data indicative of at least one content category of interest to a subscriber;

means for receiving content data relating to standard printed content of a periodical, in which said content data is independent of said personal preference data;

means for comparing said content data with said personal preference data;

means for generating index data based upon a comparison of said content data with said personal preference data; and means for outputting a customized index containing said index data to be attached to said periodical and to be separate from said standard printed content.

6. The system according to claim 5, wherein said content data includes article identification data, page number data, and content code data.

7. The system according to claim 5, wherein the means for receiving personal preference data includes means for transmitting an information request to a subscriber of a periodical;

means for receiving personal preference data in response to said information request;

a personal preference database for storing said personal preference data; and means for retrieving said personal preference data from said personal preference database.

8. The system according to claim 5, wherein the means for outputting comprises a printer configured to print the customized index data on an outer wrap; and means for attaching said outer wrap to said periodical.

9. A method of maintaining personal preference data indicative of at least one content category of interest to a subscriber, comprising providing a communication device for ordering a subscription to a periodical containing standard printed content, the communication device containing a request for a subscriber to enter personal preference data;

receiving personal preference data from the subscriber;

storing the personal preference data received from the subscriber in a database;

receiving content data relating to the standard printed content, in which the content data is independent of the personal preference data;

comparing the content data with the personal preference data;

generating index data based upon a comparison of the content data with the personal preference data; and generating, based on the index data, a customized index to be attached to the periodical and to be separate from the standard printed content.

10. The method according to claim 9, wherein said providing comprises inserting the communication device in an issue of the periodical.

11. The method according to claim 9, wherein said personal preference data relates to a category of a periodical's standard printed content.

12. A system for maintaining personal preference data indicative of at least one content category of interest to a subscriber, comprising:

means for providing a communication device for ordering a subscription to a periodical containing standard printed content, the communication device containing a request for a subscriber to enter personal preference data;

means for receiving personal preference data from the subscriber;

a database for storing the personal preference data;

means for receiving content data relating to the standard printed content, in which the content data is independent of the personal preference data;

means for comparing the content data with the personal preference data;

means for generating index data based upon a comparison of the content data with personal preference data; and means for generating, based on the index data, a customized index to be attached to the periodical and to be separate from the standard printed content.

13. The system according to claim 12, wherein the means for providing comprises means for inserting the communication device in an issue of the periodical.

14. The system according to claim 12, wherein said personal preference data relates to a category of a periodical's standard printed content.

15. A method of generating a database that stores index data comprising:

receiving from a periodical subscriber personal preference data indicative of at least one content category of interest to the subscriber;

receiving content data indicative of standard printed content contained in a periodical, in which the content data is independent of the personal preference data;

comparing the personal preference data with the content data to identify the standard printed content of interest to the subscriber contained in the periodical; and storing index data relating to the identified standard printed content of interest in a database, the index data to be used for creating a customized index to be attached to the periodical and to be separate from the standard printed content.

16. The method according to claim 15, wherein said receiving from a periodical subscriber comprises
receiving a subscriber card containing the personal preference data.

17. The method according to claim 15, wherein said receiving content data indicative of standard printed content comprises
receiving the content data through electronic communications.

18. A system for generating a database that stores index data, comprising:
means for receiving from a periodical subscriber personal preference data indicative of at least one content category of interest to the subscriber,
means for receiving content data indicative of standard printed content contained in a periodical, in which the content data is independent of the personal preference data;
means for comparing the personal preference data with the content data to identify the standard printed content of interest to the subscriber contained in the periodical; and
a database for index data relating to the identified standard printed content of interest, the index data to be used for creating a customized index to be attached to the periodical and to be separate from the standard printed content.

19. The system according to claim 18, wherein the means for receiving from a periodical subscriber comprises
means for receiving a subscriber card containing the personal preference data.

20. The system according to claim 18, wherein the means for receiving content data indicative of standard printed content comprises
means for receiving the content data through electronic communications.

21. A method of constructing a magazine with a customized index, comprising:
receiving subscriber data relating to a subscriber of a periodical having standard printed content;
receiving index data relating to identified standard printed content of interest to the subscriber, the identified standard printed content being identified based on a comparison of personal preference data related to the subscriber with content data indicative of the standard printed content, in which the content data is independent of the personal preference data; and
printing the index data and the subscriber data on the periodical to generate a customized index, in which the customized index is separate from the standard printed content.

22. The method according to claim 21, wherein the step of receiving comprises
receiving the index data through electronic communications.

23. The method according to claim 21, wherein said printing is performed at a final stage of a bindery line.

24. The method according to claim 21, wherein said printing comprises
printing the index data and subscriber data on an outer wrap; and
attaching the outer wrap to the periodical.

25. A system for constructing a magazine with a customized index, comprising:
means for receiving subscriber data relating to a subscriber of a periodical having standard printed content;
means for receiving index data relating to identified standard printed content of interest to the subscriber, the identified standard printed content being identified based on a comparison of personal preference data related to the subscriber with content data indicative of the standard printed content, in which the content data is independent of the personal preference data; and
a printer for printing the index data and the subscriber data on the periodical to generate a customized index, in which the customized index is separate from the standard printed content.

26. The system according to claim 25, wherein the means for receiving comprises
means for receiving the index data through electronic communications.

27. The system according to claim 25, wherein the printer is located at a final stage of a bindery line.

28. The system according to claim 25, wherein the printer includes means for printing the index data and subscriber data on an outer wrap, and
wherein the system further includes means for attaching the outer wrap to the periodical.

29. An index for use with a periodical to be delivered to a subscriber, comprising;
a customized index identifying standard printed content of a periodical, the identified standard printed content being of interest to a subscriber according to a comparison of preselected personal preferences indicative of at least one content category of interest to the subscriber with content data relating to the standard printed content, in which the content data is independent of the preselected personal preferences, the identified standard printed content of interest being contained in the periodical and the customized index being attached to the periodical and being separate from the standard printed content.

30. An index for use with a periodical to be delivered to a subscriber, the index manufactured according to a process comprising:
receiving personal preference data indicative of at least one content category of interest to a subscriber;
receiving content data relating to standard printed content contained in a periodical, in which said content data is independent of said personal preference data;
comparing said content data with said personal preference data;
generating index data based upon said comparison; and
generating a customized index containing said index data to be attached to said periodical and to be separate from said standard printed content.

31. The method of claim 9, wherein said communication device comprises a subscription card.

32. The system of claim 12, wherein said communication device comprises a subscription card.

33. A method of manufacturing a customized index for use with a periodical, comprising:
receiving personal preference data indicative of at least one content category of interest to a subscriber;
receiving content data relating to standard printed content of a periodical containing a predetermined set of articles, in which said content data is independent of said personal preference data;
comparing said content data with said personal preference data;
creating index data based upon said comparison of said content data with said personal preference data; and providing a customized index based on said index data, said customized index to be printed with said periodical and to be separate from said standard printed content.

34. The method of claim 33, wherein said providing a customized index based on said content data includes providing an electronic transmission representative of the customized index.

35. A system for manufacturing a customized index for use with a periodical comprising:

provide means for receiving personal preference data indicative of a content category of interest to a subscriber;

means for receiving content data relating to standard printed content of a periodical, in which said content data is independent of said personal preference data;

means for comparing said content data with said personal preference data;

means for creating index data based upon a comparison of said content data with said personal preference data; and means for creating an electronic signal representative of a customized index containing said index data, said customized index to be printed with said periodical and to be separate from said standard printed content.

36. A method of maintaining personal preference data indicative of at least one content category of interest to a subscriber, comprising:

providing a communication device for ordering a subscription to a periodical containing standard printed content, the communication device containing a request for a subscriber to enter personal preference data;

receiving personal preference data from the subscriber;

saving the personal preference data received from the subscriber in a database;

receiving content data relating to the standard printed content, in which the content data is independent of the personal preference data, comparing the content data with the personal preference data; and generating, based upon a comparison of the content data with the personal preference data, an electronic signal representative of a customized index to be printed with the periodical and to be separate from the standard printed content of the periodical.

37. An index for use with a periodical, the index manufactured according to a process comprising:

receiving personal preference data indicative of a content category of interest to a subscriber;

receiving content data relating to standard printed content contained in a periodical, in which said content data is independent of said personal preference data;

comparing said content data with said personal preference data;

creating index data based upon said comparison; and creating an electronic signal representative of a customized index containing said index data, said customized index to be printed with said periodical and to be separate from said standard printed content.

* * * * *

UNITED STATES PATENT AND TRADEMARK OFFICE
CERTIFICATE OF CORRECTION

PATENT NO.     : 6,377,963 B1
DATED          : April 23, 2002
INVENTOR(S)    : Jay S. Walker and Thomas M. Sparico It is certified that error appears in the above-identified patent and that said Letters Patent is hereby corrected as shown below:

Column 7,
Line 19, please cancel "subscriber database 253.(step 545)." and insert -- subscriber database 253 (step 545). --
Line 58, please cancel "number for records(step 650)" and insert -- number of records (step 650) --

Column 13,
Line 5, please cancel "customized index based on said content data includes pro-" and insert -- customized index based on said index data includes pro- --

Signed and Sealed this

Ninth Day of September, 2003

JAMES E. ROGAN
*Director of the United States Patent and Trademark Office*